United States Patent [19]

Beaudet et al.

[11] Patent Number: 5,559,945
[45] Date of Patent: Sep. 24, 1996

[54] DYNAMIC HIERARCHICAL SELECTION MENU

[75] Inventors: Phillip Beaudet, Pickering, Canada; Matthew Black; Jonathan Edwards, both of Lexington, Ky.; Julian Jones, Toronto, Canada; Eduardus A. T. Merks; Roger Spall, both of North York, Canada

[73] Assignee: International Business Machines Corporation, Armonk, N.Y.

[21] Appl. No.: 233,160

[22] Filed: Apr. 25, 1994

[30] Foreign Application Priority Data

May 4, 1993 [CA] Canada ................................. 2095452

[51] Int. Cl.⁶ .................................................. G06F 3/14
[52] U.S. Cl. ........................... 395/156; 395/160; 395/157
[58] Field of Search ..................... 395/156, 160, 395/157, 159; 345/146, 119, 902

[56] References Cited

U.S. PATENT DOCUMENTS

| | | | |
|---|---|---|---|
| 4,821,211 | 4/1989 | Torres | 395/156 |
| 4,920,514 | 4/1990 | Aoki | 395/156 X |
| 5,179,653 | 1/1993 | Fuller | 395/156 |
| 5,263,174 | 11/1993 | Layman | 395/156 X |
| 5,425,140 | 6/1995 | Bloomfield et al. | 395/156 |
| 5,463,727 | 10/1995 | Wiggins et al. | 395/156 |
| 5,485,175 | 1/1996 | Suzuki | 395/156 |

OTHER PUBLICATIONS

Research Disclosure No. 34698, List Boxes Within Combination Boxes or List Boxes.

*Primary Examiner*—Raymond J. Bayerl
*Attorney, Agent, or Firm*—Douglas H. Lefeve

[57] ABSTRACT

A control window for navigating and implementing menu selections in a multiple level hierarchical menu is provided having a first zone displaying a list of the selection levels and a second zone displaying a list of the selection options within a selection level. The second zone is refreshed with selections for another selection level in the menu hierarchy in response to a user implementation or registration of a selection option at the originally displayed selection level. Preset default settings in all selection levels permit the user to implement a "fast path" hierarchical menu selection.

20 Claims, 2 Drawing Sheets

DYNAMIC HIERARCHICAL SELECTION MENU

BACKGROUND OF THE INVENTION

1. Field of the Invention

The present invention relates to the general area of computer user interface, and is particularly directed to a control window providing selection options and display of multiple selection levels.

2. Description of Related Art

"Menus" are the format used in computing environments for displaying to the user, in the form of prompts, the choices available to select and implement a computer task.

In order to make user interfaces, such as menus, widely useable, it is quite important that the prompts displayed are accessible to the user, that is, the user can easily recognize the nature of the prompts and work with them. Displaying obscure prompts or cluttering a menu presentation simply confuses the user and reduces the usability of the computer application.

Thus, where the choice set in a menu is too large to display at once, the menu is generally subdivided into a logically structured hierarchy that the user passes through by making selections at each level of the hierarchy and putting in place a complete set of command parameters for the computer's performance of the desired task.

For further clarity of presentation, it is usually provided that the selection of an option at one level determines the displayed range of options for subsequent (lower) levels in the menu hierarchy.

The forgoing leads to a common problem that arises in user interface design, namely the support of choice selection through the multiple levels or tiers of a hierarchical menu structure, especially where the range of choices available at one level is dependent on the selections made at a previous or higher level.

A hierarchical menu situation can arise in many different types of applications, from the systems analyst's implementation of a database search or object/class query, to the everyday user's start-up of a personal computer management program.

For example, a query action may require the specification of several (possibly four or more) query field values, where each is chosen from a mutually exclusive set of values or choices. Furthermore, selection of the first value may change the available set for the second value, and so on through to the last level or tier, creating the effect of hierarchical levels through which the user must navigate while making selections at each level that will affect the choices available at subsequent levels. The query action will be implemented only after the value for the final level has been selected.

A somewhat similar situation can be faced by the everyday PC user in accessing a simple personal computer management program, such as a word processing program. The user may be faced with a series of menus each displaying several options, where the choice in each menu can determine the range of choices available in the menu at the next level.

In all of these applications, one traditional format for presenting the choices to the user is as a cascade of menus, each menu displaying only the choices available at that level. Once the choice is made, the menu and its selection disappear from view to be replaced by the menu listing the possible selections for the next level in descending through the levels of the menu selection. Thus, the user has no visual record of menu selections from previous higher levels and cannot easily alter an inappropriate earlier menu selection without passing through each earlier menu in the cascade in order to locate the selection now sought to be corrected.

Proposed methods for simplifying hierarchical selections and providing the user with ready access to earlier selections employ multiple listboxes. A single listbox is provided for every level of menu selection listing all possible options. In one format, the listboxes are "tiled" in descending order from one side to the other on a laterally scrolled display. However, as all permutations of menu level selections must be displayed simultaneously on the multiple listboxes, the number of menu level selections or the complexity of each menu level is necessarily determined by the display size.

In a second format, the multiple listboxes are displayed in offset overlay (as multiple "windows"), permitting the user to bring the list box of an earlier selection level to the foreground (by clicking the mouse on it) for review or change. Again, however, screen size, along with the desire to avoid undue clutter in presentation, limits the hierarchical depth and individual list box length (or range of options) for which this style of interface is viable.

A similar approach to that of multiple listboxes is taken in U.S. Pat. No. 5,179,653 to Fuller. In this menu system, pushbuttons for three selection levels of a menu system are displayed simultaneously around the periphery of a graphics data work area on a display screen. Again, the display size is a limiting factor in the number of menu selection levels that may be presented, and of the complexity at each level. In Fuller, it is specifically disclosed that the labelling on the pushbuttons at the second and third descending levels are generic in nature to increase the range of options. However, use of generic labelling limits the usability of this menu display to expert users.

SUMMARY OF THE INVENTION

It is therefore an object of the present invention to provide a control mechanism for implementing a user interface to display, in a single screen format, a hierarchical or multiple level selection path that is easily accessible by the novice user.

It is also an object of the present invention to provide a multiple level selection menu with a fast path for the expert user.

It is a further object of the present invention to provide on a single screen, multi-level menu display with dynamically changing values to reflect selections entered by the user.

According to the foregoing objects, the present invention offers a simple yet elegant approach to the problem of presenting hierarchical menu selections to the computer user by providing a single selection screen which combines a finite number of pushbuttons with text fields and a single, dynamically changing listbox. This arrangement increases the user's comprehension and comfort in passing through the cascading levels of selection options in a menu hierarchy.

In one aspect, in a computer system having a display screen, the invention provides a user interface mechanism for hierarchical menu selections. The user interface comprises a zoned menu control window that includes a first zone displaying indicators representing a plurality of selection levels in a menu hierarchy, and a second zone having contents comprising a displayed list of selection options for one of the selection levels in the menu hierarchy. The interface also includes means for entering an option selected from the displayed list of options, means for refreshing the contents of the second zone by replacing the displayed list of selection options with a second list of selection options for a different selection level in the menu hierarchy in response to entry of an option selected from said displayed list of selection options, and registration means for implementing n computer task on selection of options for all selection levels in the menu hierarchy.

Preferably, the means for refreshing the contents of the second zone replaces the displayed list of selection options with a second list of selection options for an inferior selection level in the menu hierarchy.

Preferably, the indicators in the first zone consist of a plurality of pushbuttons, each pushbutton correlating to one selection level within the menu hierarchy, and the second zone consists of a listbox.

Preferably, the control window also includes a text field adjacent the pushbuttons stating the selection effected at each level, thereby providing a visual record to the user of the selections made at each level of the menu hierarchy.

In another aspect, the present invention is also directed to a method for assembling and displaying a hierarchical selection menu on a computer display screen. The method comprises the computer implemented steps of creating a zoned menu control window, displaying in a first zone of the control window, a number of indicators, each of which corresponds to a separate selection level in the menu hierarchy, and displaying in a second zone of the control window, a list of selection options for one of the selection levels in the menu hierarchy. In response to entry of an option from the displayed list of selection options, the displayed list of selection options in the second zone is replaced with a second list of selection options for a different selection level in the menu hierarchy.

The present invention is also directed to a method of assembling and displaying a hierarchical selection menu on a computer screen. This method comprises the computer implemented steps of creating a menu control window having multiple zones, displaying in a first zone in the menu control window, a plurality of pushbuttons each of which represents a separate level in the menu hierarchy, displaying within a second zone in the menu control window, a list of selection options for the highest level not yet selected in the menu hierarchy, and, in response to a pushbutton level selection, refreshing the list of displayed selection options with a list of available selection options for the next highest level not yet selected in the menu hierarchy.

In a further aspect, the present invention is directed to a fast process for implementing hierarchical menu selections in which default selection values are preset and displayed to the user for registration as option selections to implement a computer task.

BRIEF DESCRIPTION OF DRAWINGS

Embodiments of the invention will now be described in detail in association with the accompanying drawings, in which.

DETAILED DESCRIPTION OF THE PREFERRED EMBODIMENT

Figure 1:
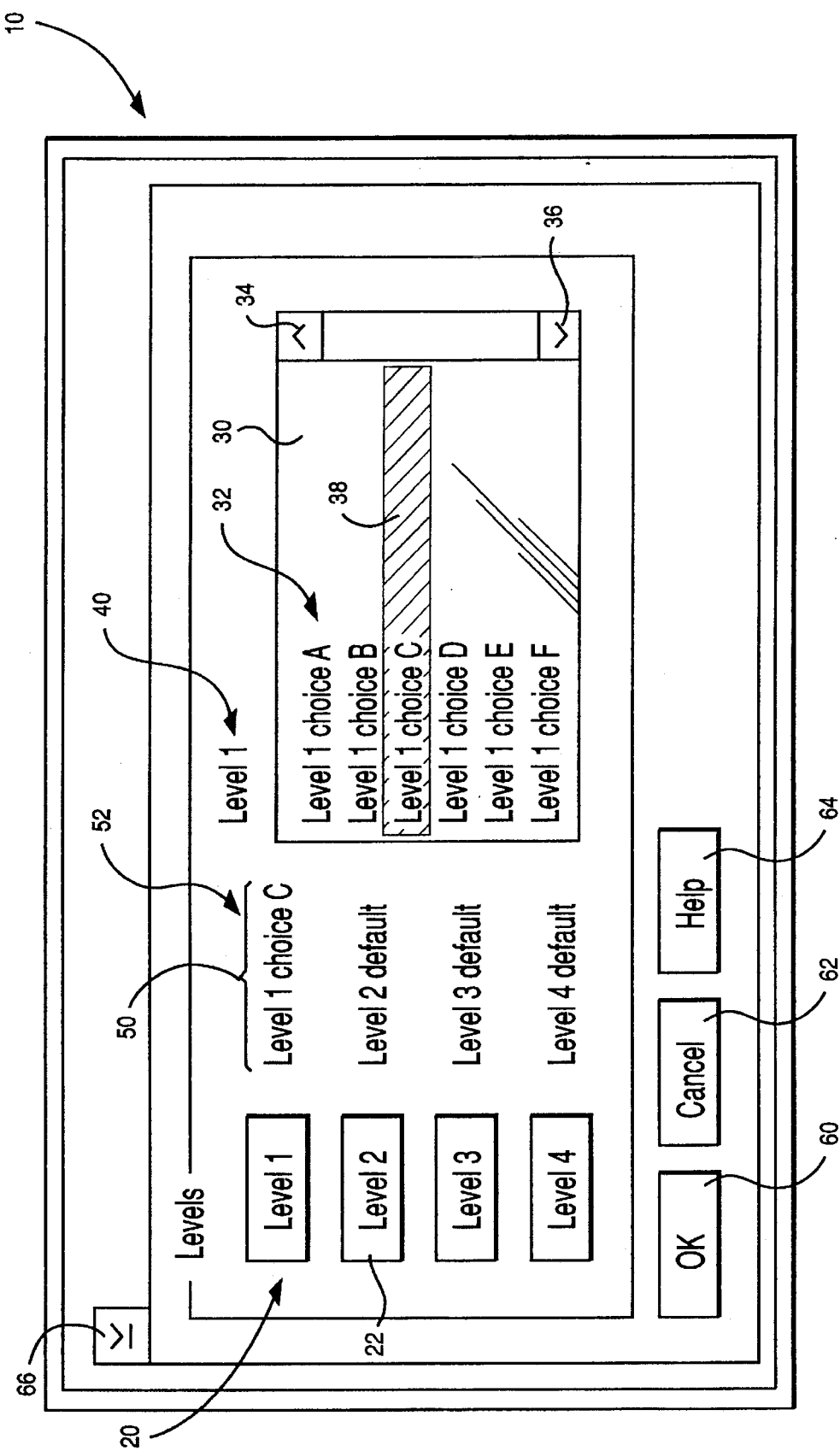
FIG. 1 is a pictorial view of a control window for effecting and displaying multiple level choices.

Referring to FIG. 1, a hierarchical selection menu is presented in the form of a control window, generally designated by the numeral 10. As discussed hereafter, the control window 10 contains multiple zones or fields representative of the hierarchical levels and selection options at each level that comprise the preferred embodiment of this application.

A first zone 20 in the control window 10 displays a vertical array of pushbutton indicators 22. Each pushbutton 22 corresponds to and is representative of a separate selection level in the menu hierarchy. For ease of use and understanding, these pushbuttons are ranked in descending order from superior to inferior selection levels, that is, the pushbutton identified as "Level 1" in the control window 10 represents the primary or highest selection level in the menu hierarchy, the pushbutton identified as "Level 2" represents the second level after the first in the menu hierarchy, and so on down to the lowest or most inferior pushbutton/menu selection level.

Opposite the first zone 20, a second zone in the control box 10 displays a list box 30 containing a list of the selection options (designated by numeral 32) available at the current selection level under consideration. This current selection level will normally be the highest level in the menu hierarchy at which no selection has been made by the computer user. However, the invention also provides for special situations where the user's selections are entered out of hierarchical order. For example, the provision of preset default values in some or all of the hierarchy levels permits the user to selectively enter inferior or lower selection levels in the menu hierarchy. Also, the user is permitted to backtrack in the menu hierarchy to change a selection made at an earlier level in the hierarchy. A title field or bar 40 is superimposed over the list box 30 and displays the name of the selection level corresponding to the options displayed in the list box 30, in order to clearly direct the user in the selection level being implemented.

Intermediate the first zone 20 and the list box 30 is a text field 50 displaying a line of text 52 adjacent each pushbutton 22, providing the user with a visual record of the current selection of options throughout the menu hierarchy represented in the control window 10.

In the preferred embodiment of the invention shown in FIG. 1, a focus area in the form of a contrast bar 38 is provided in listbox 30 highlighting the current option selected for the particular level "x" under consideration. On entering a selection level, the focus area is automatically on the listbox 30 which has repainted itself with the list of selection options for that level, and the contrast bar 38 highlights the default value calculated and currently selected for that level. The contrast bar may be moved up and down the list 32 in the list box 30 by simply pressing the terminal cursor arrow keys up or down to highlight each selection option until the desired option is located.

The location of the contrast bar 38 on a list item 32 in the listbox 30 has a direct effect on the contents of the text field 50. As will be described in greater detail below, the text line 52 displayed adjacent the pushbutton 22 of the level currently displayed in the listbox changes to reflect the selection option highlighted by the contrast bar 38. In addition, the default choices of the inferior selection levels are automatically re-calculated and displayed as the text lines 52 adjacent their respective pushbuttons 22.

When the contrast bar 38 is highlighting the user's preferred option, the user can enter the selection by known means such as pressing the "ENTER" key or double-clicking the mouse.

As a further visual aid to the user, unique colours may be used to identify each selection level in the menu hierarchy. Each colour could appear on the pushbutton 22 associated with the levels in the menu hierarchy on initialization of the menu control window, or, alternatively, could only appear on each pushbutton once the user has initialized an event for its associated selection level. In one embodiment, when colour display is used as indicative of selection level, the text line 52 adjacent a pushbutton would be implemented in the same colour, as well as the background colour of the list box 30 at the time the list of selection options for a particular level is displayed there. This would maximize the visual correlation to the user between the three main fields in the control window 10.

In addition, a few standard user interface features that will be readily recognizable to the ordinary computer user are provided for common functions, as discussed below.

Figure 2:
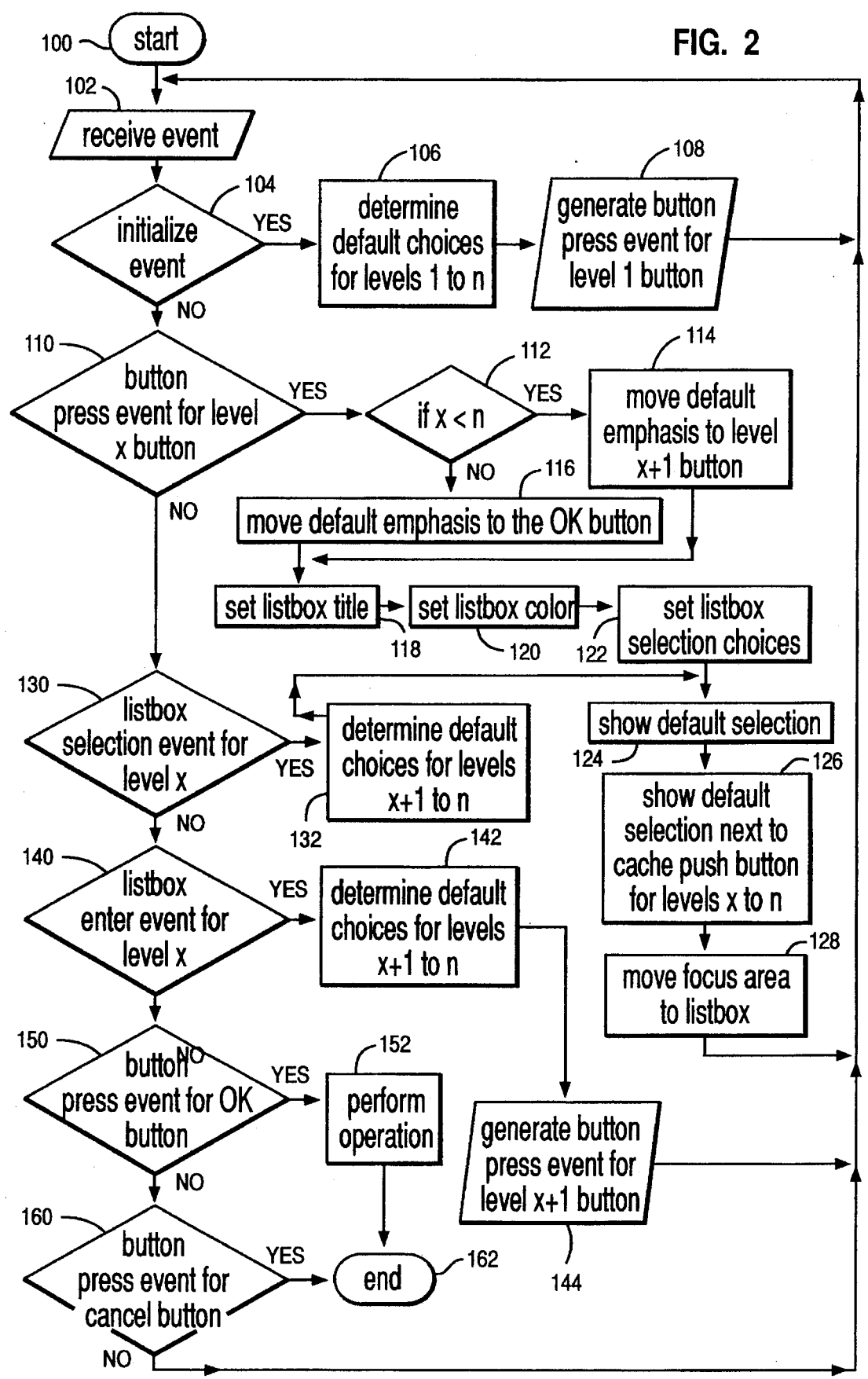
FIG. 2 is a flow chart showing the event steps for computer implementation of a dynamic user interface for a hierarchical selection menu according to the present invention.

As shown in blocks 100 and 102 in FIG. 2, after starting and initializing the system, the computer receives an event signal generated by a computer user action, such as registration of a keyboard action or mouse movement. On first entry to the menu hierarchy, the event signal would generally include a system load of the menu hierarchy for the specific application or program selected for implementation by the computer user.

On receiving the event, the computer determines if the event must be initialized (block 104). Initialization of the control window of FIG. 1 involves the determination and assignment of default values for all levels (n) of the menu hierarchy 106, and the display of selection options for the primary level (Level 1) of the menu hierarchy in the list box 30 of FIG. 1 and the title for Level 1 in the title bar 40, before generating the "button press event" (access to a selection level in the menu hierarchy) for the pushbutton representing the primary or first level in the menu hierarchy 108 (FIG. 2). The generation of this "button press event" becomes the new initialized event received by the computer.

In the preferred embodiment, on initiating the control window 10, default values for all of the levels in the menu hierarchy are automatically determined and entered as preset values in the menu hierarchy (block 106 in FIG. 2). These predetermined default values could either be set values in the system, or could be the user's own selections retained from an earlier implementation of the selection control window.

Although default values are predetermined in the preferred embodiment, the settings could be programmable to permit the expert user to tailor the system for particular applications.

The event initialization of box 106 in FIG. 2 will occur only once, on initialization of the control window 10 display shown in FIG. 1. On receiving the "button press event" for Level 1 (block 108), the computer's determination that no further event need be initialized (block 104) will initiate display of the control window.

On initiation of the menu control window 10 display, the pre-set default selections appear as the text descriptions 52 in the text field 50 beside each corresponding pushbutton 22 in the first zone 20, including that for the Level 1 pushbutton in the menu hierarchy.

Where colour coding is used, the common colours for the pushbutton 22 and text line 52 at each selection level would also be implemented on initiation of the control window 10, and the colour coding associated with Level 1 would then be shown as the background colour for the list box 30 containing the selection options for Level 1.

On opening the control window 10, the contrast bar 38 is set on the default setting for Level 1 in the listbox 30 (not shown in FIG. 1).

At this point, the computer user can determine whether to maintain the default selection provided for Level 1 or to substitute an alternate option for the default selection. The user can maintain the default selection and pass through to the next selection level simply by entering the selection using known means such as pressing the "ENTER" terminal key action or double-clicking the mouse. This selection entry constitutes the "button press event" for the next (inferior) selection level in the menu hierarchy (block 110).

As shown at block 112 of FIG. 2, entry of the "button press event" at any selection level causes the computer to verify whether this selection level is the last level in the menu hierarchy. Where the computer identifies the selected level as the last selection level in the menu hierarchy (block 116), the default emphasis in the control window is shifted to a task implementation indicator. In the illustrated embodiment, the task implementation indicator is the "OK" button 60 (in FIG. 1), which is automatically activated as the conduit to enable the user to register the command to implement the computer task established by the options currently selected in the menu hierarchy (blocks 150 and 152 in FIG. 2).

To consider other selection options at the displayed selection level, the user can move the contrast bar 38 up and down the list of selections in the listbox 30 by using the arrow keys, or possibly by locating the mouse cursor and clicking the mouse on different options.

Whenever the contrast bar 38 moves to a different option in the selection list, the computer recognizes a "listbox selection event" (block 130), and changes the text field 50 to show the default selections for inferior levels of the currently highlighted option. The new default selections are determined through implementation of the computer generated steps illustrated in blocks 132, 124, 126 and 128 of FIG. 2, namely, determination of the default choices for all inferior levels to the level currently listed in the listbox, and repainting the text field to display those new default selections while moving the focus area back to the listbox.

It is this automatic change of inferior selection options in the invention that allows a user to return to a higher menu selection level at any time. The user can press the "ENTER" key or click the mouse on the pushbutton for a desired level in order to generate a "button press event" to implement the computer steps for that level (block 110), the computer assuming selection entry for the immediately preceding (superior) level.

Where, following a "button press event" (block 110), the computer identifies the selected level as being a level superior to the last selection level in the menu hierarchy (block 112), the default emphasis is moved to the next inferior selection level in the menu hierarchy (block 114), and the contents of the second zone are refreshed with selection information for the new selection level. The steps implemented by the computer to refresh the contents of the second zone are set out in FIG. 2, as:

1. replacing the listbox title (in title field 40 of FIG. 1) with the title of the new selection level (block 118);

2. changing the background colour of the listbox 30 to the colour shown on the pushbutton associated with the new selection level (block 120); and 3. replacing the list of selection options in the listbox with a new list of selection options available for the new selection level (block 122).

After this the remaining steps illustrated in blocks 124, 126 and 128 are implemented, as discussed above. Thus, immediately on fixing the contents of the listbox 30, the contrast bar 38 highlights the selection option corresponding to the default value identified in text line 52 for the new selection level (box 124 in FIG. 2), determines and enters the default values in text field 50 for inferior levels in the menu hierarchy (block 126 in FIG. 2), and moves the focus area to the listbox 30 (block 128).

When the user decides on a selection option for the level "x" currently displayed, the selection can be entered as a "listbox enter event" for the level by double-clicking the mouse or pressing the "ENTER" key when the contrast bar 38 is located on the selection (block 140). This selection causes the default selection values for all inferior selection levels to be determined (block 142) and generation of the "button press event" for the next inferior level (block 144), before returning to the loop for initializing and displaying the new selection level following the steps discussed above.

The list of selection options for Level 1 displayed in the listbox 30 will naturally be the broadest available for implementing the application. However, the contents of option lists for subsequent levels may vary significantly as the available range of selection options is determined by selections made at superior levels.

Although the listings 32 of selections in the listbox 30 are presented in FIG. 1 as generic listing labels, the text for each listing within the list box 30 would normally be descriptive to aid, as much as possible, the novice user as well as the expert user exploring complex applications. Further, "PAGE UP" and "PAGE DOWN" scroll bars 34 and 36 are provided in the frame 35 of the list box to increase the usable display area within the list box 30, and although not shown, it would be obvious to one skilled in tile art to include one or more horizontal scroll bars for longer textual descriptions.

Similarly, the title in the title field 40 would contain a descriptive, rather than generic, title for the selection level. In one format, the title would reflect the wording of the correlated pushbutton for that level.

Since in the preferred embodiment, on initiating the control window 10, the selections in the menu hierarchy are automatically preset at default values, a fast path or process is provided for implementing computer tasks using the preset selections and bypassing the selection levels.

In addition, where the default settings are also programmable, the expert user is provided with a means for implementing a customized fast path for preparing a query or entering all application by simply registering all selection levels in the menu hierarchy using the pre-programmed selection values to bypass the selection levels.

In either case, the fast path may be implemented by the user immediately on initiation of the control window 10, by moving the focus area or mouse cursor to the "OK" button 60 in FIG. 1, and clicking the mouse or pressing the terminal keyboard "ENTER" key as the "button press event" to register the selections for all levels and initiate the computer s performance of the defined operation (blocks 150 and 152, FIG. 2).

The preferred embodiment for this invention has been illustrated in FIG. 1 as containing four nested selection levels. However, it will be obvious to one skilled in the art that the procedure illustrated in FIG. 2 could be implemented with a substantially deeper hierarchy, the provision of more levels of pushbuttons 22 in the control window 10 being made possible either by a rearrangement of the screen display, or through utilizing a scroll for off-screen levels. It should be recognized, however, that even four levels of hierarchical menu selections can represent an extensive and very detailed set of selections, and should be sufficient, with very little modification, for most applications.

In addition to the foregoing and as illustrated in FIG. 1, standard 'HELP' and 'CANCEL' pushbuttons 62 and 64 are provided. As is known, the 'HELP' pushbutton enables the user to access information on the functioning of the option selected (in this case, information would be provided on the multi-level menu selector itself), and the 'CANCEL' pushbutton allows the user to cleanly exit the function (block 160 in FIG. 2).

While the invention has been particularly shown and described with reference to a preferred embodiment, those skilled in the art will understand that various changes in form and detail may be made without departing from the spirit and scope of the invention.

The embodiments of the invention in which an exclusive property or privilege is claimed are defined as follows:

1. In a computer system having a display screen, a user interface mechanism for hierarchical menu selections comprising:

a zoned menu control window including a first zone displaying indicators representing a plurality of selection levels in a menu hierarchy, and a second zone having contents comprising a displayed list of selection options for one of said selection levels;

means for entering an option selected from said displayed list of selection options;

means for refreshing the contents of the second zone by replacing the displayed list of selection options with a second list of selection options for a different selection level in response to entry of an option selected from said displayed list of selection options; and registration means for implementing a computer task on selection of options for all selection levels in the menu hierarchy.

2. A computer system, according to claim 1, wherein the means for refreshing the contents of the second zone comprises replacing the displayed list of selection options with a second list of selection options for an inferior selection level in the menu hierarchy.

3. A computer system, according to claim 1, further comprising:

means for verifying inferior selection levels in the menu hierarchy in response to entry of an option selected from said displayed list of selection options;

a task implementation indicator linkable to said registration means; and means for linking said task implementation indicator and registration means in response to a failure to verify inferior selection levels in the menu hierarchy, whereby to permit engagement of the registration means through the task implementation indicator.

4. A computer system, according to claim 1, wherein the indicators displayed in the first zone comprise a plurality of pushbuttons, each pushbutton correlating to a separate selection level in the menu hierarchy.

5. A computer system, according to claim 4, wherein the pushbuttons are ranked from superior to inferior levels in the menu hierarchy.

6. A computer system, according to claim 1, wherein the second field comprises a scrolled listbox.

7. A computer system, according to claim 6, wherein the second zone further comprises a title field containing a displayed title identifying said one selection level, and wherein the means for refreshing the contents of the second zone replaces the displayed title with a second title for said different selection level.

8. A computer system, according to claim 1, wherein the menu control window further comprises a third zone containing a text field adapted to display the options selected for each selection level in the menu hierarchy.

9. A computer system, according to claim 1, further comprising means for setting default selection values in several selection levels of the menu hierarchy.

10. A computer system, according to claim 9, wherein the means for setting default selection values sets default selection values for all levels in the menu hierarchy in response to initiation of the menu control window.

11. A computer system, according to claim 9, wherein the means for setting default selection values are programmable.

12. A computer system, according to claim 9, wherein the second zone further comprises a movable focus bar for highlighting a single selection option in the displayed list, the focus bar being linked to said means for entering an option, whereby to permit entry of a highlighted selection option.

13. A computer system, according to claim 12, wherein the means for setting default selection values sets default selection values for all inferior levels in the menu hierarchy in response to movement of the focus bar on the displayed list of selection options.

14. A computer system, according to claim 13, wherein the control window further comprises a third zone containing a text field adapted to display: option selections entered for superior levels; a highlighted selection option from the displayed list of selection options; and the default selection values for all inferior levels in the menu hierarchy.

15. A method of assembling and displaying a hierarchical selection menu on a computer display screen, comprising the computer implemented steps of:

creating a menu control window having at least a first and a second zone;

displaying in the first zone of the control window, a plurality of indicators, each indicator representing a separate selection level in a menu hierarchy;

displaying in the second zone of the control window, a list of selection options for one of said selection levels in the menu hierarchy; and in response to entry of an option from the displayed list of selection options, replacing the displayed list of selection options in the second zone with a second list of selection options for a different selection level in the menu hierarchy.

16. A method, according to claim 15, further comprising, in response to entry of an option from the displayed list of selection options, the step of verifying inferior selection levels in the menu hierarchy, and displaying as the second list in the second zone, a list of selection options for an inferior selection level.

17. A method, according to claim 15, further comprising the step of displaying options previously selected for any selection level in the menu hierarchy.

18. A method of assembling and displaying a hierarchical listing of menu selections made by a computer user, said method comprising:

displaying a menu control window having multiple zones;

displaying within a first zone in said menu control window, a list of levels of the menu hierarchy;

displaying within a second zone in said menu control window, a list of selection options for a highest level not yet selected in the menu hierarchy;

displaying options previously selected for any selection level in the menu hierarchy; and refreshing the second zone with a new listing of selection options from all immediately inferior selection level in the menu hierarchy in response to a user selection from the second zone.

19. A method, according to claim 18, further comprising implementing a computer task in response to user registration of entry of all selection levels in the menu hierarchy.

20. A fast process for implementing selections through a menu hierarchy, comprising the computer implemented steps of:

setting default selection values for all selection levels in the menu hierarchy;

creating a zoned menu control window; displaying in a first zone of said control window a plurality of indicators, each indicator setting forth the default selection value for a separate selection level in the menu hierarchy;

setting a movable default emphasis on one superior selection level having selection options;

displaying in a second zone a list of selection options for a selection level subject to the default emphasis; and implementing a computer task in response to user registration of selection of options for all selection levels in the menu hierarchy.

\* \* \* \* \*